(12) United States Patent
Howland

(10) Patent No.: US 7,758,710 B2
(45) Date of Patent: Jul. 20, 2010

(54) METHOD FOR MAKING ADHESIVE FABRIC JOINTS WITH HEAT AND PRESSURE BY COMPARING ACTUAL JOINT PARAMETERS TO PRE-CALCULATED OPTIMAL JOINT PARAMETERS

(75) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 812 days.

(21) Appl. No.: 11/668,512

(22) Filed: Jan. 30, 2007

(65) Prior Publication Data

US 2007/0137787 A1   Jun. 21, 2007

Related U.S. Application Data

(63) Continuation of application No. 10/763,555, filed on Jan. 23, 2004, now Pat. No. 7,192,498.

(60) Provisional application No. 60/442,104, filed on Jan. 23, 2003.

(51) Int. Cl.
*B32B 41/00* (2006.01)
*B32B 37/06* (2006.01)
*B29C 65/02* (2006.01)

(52) U.S. Cl. .................. 156/64; 156/304.3; 156/304.4; 156/358; 156/359

(58) Field of Classification Search .................. 156/64, 156/304.3, 304.4, 358, 359, 360, 378, 379
See application file for complete search history.

(56) References Cited

U.S. PATENT DOCUMENTS

| | | | |
|---|---|---|---|
| 5,281,454 A | 1/1994 | Hanson | |
| 5,565,264 A | 10/1996 | Howland | |
| 5,616,199 A | 4/1997 | Jurrius et al. | |
| 5,837,623 A | 11/1998 | Howland | |
| 5,976,996 A | 11/1999 | Howland | |
| 6,266,818 B1 | 7/2001 | Howland et al. | |
| 6,543,055 B2 | 4/2003 | Howland et al. | |
| 6,548,430 B1 | 4/2003 | Howland | |
| 6,668,868 B2 | 12/2003 | Howland et al. | |
| 6,693,052 B2 | 2/2004 | Howland | |
| 6,720,277 B1 | 4/2004 | Howland | |
| 2001/0002351 A1 | 5/2001 | Howland | |
| 2001/0029621 A1 | 10/2001 | Howland et al. | |
| 2002/0016118 A1 | 2/2002 | Bebber et al. | |
| 2002/0074068 A1 | 6/2002 | Howland et al. | |

(Continued)

OTHER PUBLICATIONS

PCT Search Report dated Oct. 14, 2004 of International Application No. PCT/US04/01771 filed Jan. 23, 2004.

*Primary Examiner*—George R Koch, III
(74) *Attorney, Agent, or Firm*—Vern Maine & Associates

(57) ABSTRACT

A method for joining fabrics, particularly high strength fabrics such as airship hull fabrics, including the steps of: measuring selected parameters of two fabric layers to be joined and the adhesive and any tape or other materials intended to be included in the joint; calculating therefrom an optimal value of a quality control parameter of an ideal joint, such as joint thickness, specific gravity or opacity; assembling the two fabric layers and other materials in the desired order; and applying heat and pressure to the assemblage until the selected quality control parameter of the joint, such as joint thickness, specific gravity or opacity, is satisfied.

20 Claims, 5 Drawing Sheets

U.S. PATENT DOCUMENTS

| | | |
|---|---|---|
| 2002/0111099 A1 | 8/2002 | Howland |
| 2002/0122927 A1 | 9/2002 | Howland |
| 2002/0124904 A1 | 9/2002 | Howland et al. |
| 2003/0091785 A1 | 5/2003 | Howland |
| 2003/0111128 A1 | 6/2003 | Hannigan et al. |

Example 2A - Well bonded high density joint showing fiber wetout to TPU resin.

Low creep resistance joint showing light scattering and fiber to resin voids at the interface.

ns in order to insure the desired character and quality of
METHOD FOR MAKING ADHESIVE FABRIC JOINTS WITH HEAT AND PRESSURE BY COMPARING ACTUAL JOINT PARAMETERS TO PRE-CALCULATED OPTIMAL JOINT PARAMETERS This is a continuation of U.S. application Ser. No. 10/763,555 filed Jan. 23, 2004, now U.S. Pat. No. 7,192,498, which claims priority to U.S. application Ser. No. 60/442,104, filed Jan. 23, 2003.

FIELD OF THE INVENTION

This invention relates to forming high strength fabric joints, characterized as structural joints and used in fabric constructions for airship hulls, radomes, aerostats, tension roofs, and the like, by controlling joint forming process parameters such as heat, temperature, pressure, time, density, opacity, and joint thickness directly or by feedback mechanisms in order to insure the desired character and quality of joint. The invention is particularly useful in forming high strength joints between woven fabrics made of high tenacity, e.g., 10 g/denier fibers.

BACKGROUND OF THE INVENTION

Large inflatable devices and fabric structures, such as airship hulls, radomes, aerostats, tension roofs, all require large pieces of fabric, or composite materials including fabric layers, to be joined together, since a these structures cannot typically be formed from a single piece of fabric. The joints between the fabric sections typically must be gas-tight, and are preferred to be as light in weight as possible, while being durable enough to withstand service conditions for at least the intended life span of the structure, e.g., ten years. The joints are also preferably capable of being quickly repaired using reasonably inexpensive and uncomplicated equipment. While service loads on airship hull joints and other fabric structures can very widely depending upon the type and size, the service loads can be up to 400-500 lbs/inch at the joint, and the joint may be exposed to temperatures of up to solar driven thermal conditions of 140° F. for a prolonged duration.

Since the joints are required to be gas tight, liquid tight, avoid stress concentrations, and be repairable, the use of mechanical fasteners such as sewing or rivets are not desirable for joining the sections. Heat sealing is a more useful and commonly used means for joining fabric sections together.

Thermoplastics, for example, have been used with success in some small airship applications to join hull sections together. In these lower stress applications, a non-cross linked thermoplastic, such as urethane, is applied between two fabrics, and the fabrics are joined together by heating the thermoplastic adhesive to a temperature of about 330° F. and applying a pressure of about 35 psi to the joint. The heat and pressure are applied to the joint for a relatively shore amount of time, typically less than about approximately one minute. This process can produce acceptable joints that can withstand service loads of up to about 100 lbs/inch at the joint. To produce acceptable joints under these conditions the following conditions must be observed:

1. The thermoplastic resin to fiber ratio must be nearly 1:1 by weight.
2. The thermoplastic resin must continuous coat the surfaces to be jointed.

However, higher stress applications such as that present in heavy cargo-carrying airships, large raydomes, and super light inflatables all experience much larger service loads, e.g., 150-500 lbs/inch at hull joints, and thus require the use of higher strength fabric, for example fabrics including fibers having a tenacity of 10 grams/denier of higher, and correspondingly high strength hull joints. The Applicant has confirmed by testing that conventional joint forming techniques are not suitable for such high stress applications and prolonged exposure to temperatures of approximately 140° F., which is a standard requirement for airships and other fabric structures. Creep resistance in the joint is critical as the higher loads must be supported through the thermoplastic interface. Heat seal adhesives cannot have a high cross link density. As a class of material, all thermoplastics exhibit creep behavior to some extent. In the case of thermoplastic urethanes (TPU) the hard segment behavior of these polymers gives them some intrinsic creep resistance. However even TPU materials creep and the joint design must minimize this behavior.

SUMMARY OF THE INVENTION

Simply stated, the invention encompasses a method for joining fabrics, and products thereof, the method including the steps of: measuring or otherwise taking into account selected initial parameters of the two fabric layers to be joined and the adhesive and any tape or other materials intended to be included in the joint; calculating therefrom an optimal value of at least one quality control parameter or indicator of an ideal joint than can be measured after the joint is formed, such as joint thickness, specific gravity, density, or opacity; then assembling the two fabric layers and other joint materials and adhesive in the desired order; and applying heat and pressure to the assemblage until the selected one or more quality control parameters of the joint, such as density and joint thickness or opacity, are satisfied or as nearly so as is practical.

A database of typical fabric joining scenarios and materials requirements may permit pre-calculation of optimal values of selected control parameters for some common applications, with which previously constructed joints can be easily examined for quality and consistency. Other less common or more critical fabric joining requirements, such as airships, may need to have the actual joint materials specifically examined to calculate the optimal value of one or more selected quality control indicators. Once calculated, the optimal or target value of a non-destructively measurable parameter may also be utilized in a real time measurement and feedback scheme to correct minor deviations in a continuous production process of joint fabrication.

The invention provides a high strength fabric joint and method for joining at least two fabric layers. The method is particularly useful for joining high strength fabrics including fibers that have a tenacity of 10 grams/denier or more, but can be used with lower strength fabrics. In one aspect of the invention, at least two fabric layers are provided and facing surfaces of the fabric layers are saturated with an adhesive. The saturation process preferably provides good chemical adhesion between the adhesive and fibers in the fabric layers such that fiber bundles in the fabric layers are encapsulated, but not necessarily penetrated, by the adhesive. However, the adhesive may penetrate the fiber bundles. Optionally, chemically reactive adhesion promoters may be applied to the fibers during the prior separation process to improve adhesion of the fibers to the adhesive resin. An adhesive film is then placed between the facing surfaces of the fabric layers. In order to improve the efficiency of joint production in manufacturing environment, optionally, the adhesive film can be included as part of the fabric composite or as a specialty tape construction. The adhesive film can be, or include, the same adhesive material used in the saturation process, although different adhesive material could be used.

The adhesive film is heated and pressure is applied to the fabric layers to force the fabric layers together and create good mechanical and chemical bonding between the adhesive film and adhesive material applied during the saturation process and/or fibers in the fabric layers. By maintaining the relatively high temperature and pressure conditions for an extended dwell period, the fabric layers are forced into close proximity, an intimate interface of the two surfaces, thereby eliminating voids in the adhesive, forcing the film adhesive into open spaces within the fabric layers, decreasing the amount of relatively low modulus adhesive between the fabric layers, and increasing the resulting joint strength.

In one aspect of the invention, one or more joined fabric layers include high strength fibers having a tenacity of 10/grams/denier or higher, such as that exhibited by aramid fibers or Vectran fibers. In another aspect of the invention, at least two fabric layers are joined by heating the adhesive to about approximately its melting point, applying pressure of about approximately 100 psi or greater to the joint and maintaining the pressure and temperature for at least 10 seconds. In yet another aspect of the invention, at least one joined fabric layer is a woven fabric having greater than approximately 2% crimp in the weave. This is measured by removal of fiber from the woven material and comparing the extended length out of the weave to the length of the fiber in the weave. The added length of the fiber in its serpentine path over and under other fibers in the woven is the crimp. Adequate crimp can be useful in preventing sliding or separating of yarn bundles that distorts the uniform weave pattern of one or both fabric layers and reduces the structural integrity of the joint.

In one aspect of the invention, a first fabric layer has a different crimp than a second fabric layer jointed to the first fabric layer. This is particularly useful in cases where the use of a special seaming tape is advantageous. In another aspect of the invention, chemical bond enhancing materials such as isocyanates, silanes and chemically blocked isocyanates are used in the adhesive film and/or the saturation on adhesive. In yet another aspect of the invention, a lap-type fabric joint is formed. In still another aspect of the invention, a tape-type fabric joint is formed.

The invention also provides a joint such as that used to join airship hull sections together, that includes two hull sections both joined to a common tape. The tape can have a different crimp than fabric in the hull sections. An adhesive content per unit area can also be different within the joint compared to adhesive content on the hull sections. For example, the adhesive content in the joint can be more than that in the hull sections as seen in example #2.

These and other aspects of the invention will be apparent from the following description.

BRIEF DESCRIPTION OF THE DRAWINGS

The invention is described with reference to the following drawings wherein.

DETAILED DESCRIPTION

Figure 1:
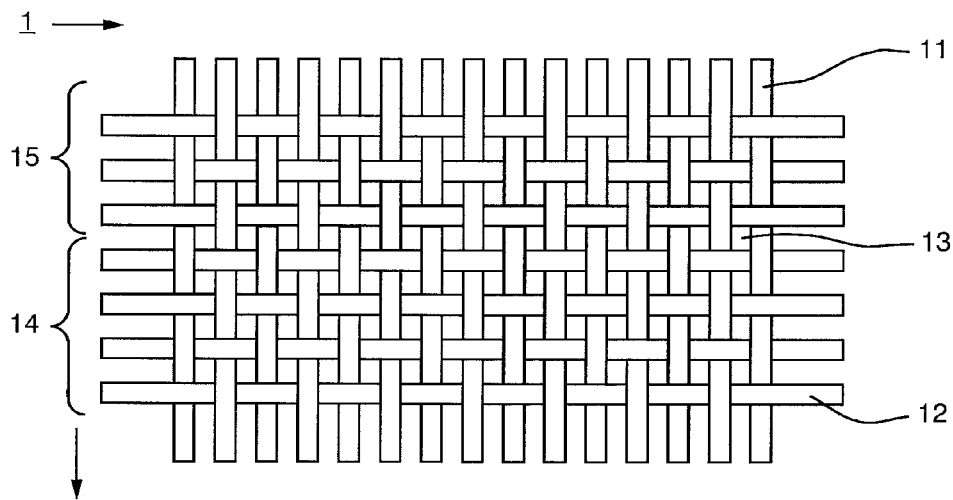
FIG. 1 shows an example of an open-weave fabric.

The invention provides a multi-layered, structural fabric and adhesive composite that is very useful as a creep resistant joint or seam connecting two sections of fabric, in particular high strength, gas-tight fabrics as may be used in airships and other critical applications, and a method for producing it. The fabric joint and method are particularly useful for joints used in high stress conditions and/or conditions in which the joint will be exposed to temperatures up to 140° F. for a prolonged period. The invention is also particularly useful with woven fabrics including fibers having a tenacity of 10 grams/denier or higher. However, the invention can be used with a variety of different types of fabrics, including a woven, knitted, composite or other fabrics, or other applications. In short, the method of the invention can be used to join two or more fabrics of any type or composition. The invention can also be used to form joints of any desired width and/or length, or for bonding two or more fabric layers to form a composite, laminated fabric structure.

Thickness Methods

In one aspect of the invention, a joint formation process is displacement controlled so that heat and pressure are applied to a joint until a thickness of the joint is equal or less than a threshold thickness. Thus, for example, a desired temperature and pressure are maintained until the joint establishes a desired thickness, rather than being maintained for a specific time. If a joint being formed reaches a desired thickness in a time less than expected, heat and/or pressure applied to the joint can be removed. In contrast, if heat and pressure are applied to a joint for a time longer than that expected, the heat and pressure can be maintained until the joint establishes a desired thickness, thereby ensuring that the joint has been properly made.

In the following example, 1500 denier Vectran fabrics were processed with aromatic ether TPU (thermoplastic polyurethanes) hot melt resins. The typical voided structure was seen in the as coated material. The bonding was attempted at two sets of conditions:

TABLE #1

Joint process showing temperature and pressure controlled bonding Example #1

| | | |
|---|---|---|
| Bonding temperature | 340 F. | |
| Bonding Pressure | 35 PSI | |
| Bonding time | 60 Sec | |
| Average thickness of fabric joint material | 0.1016 Cm | Before bonding |
| Thickness of joint based Density method | 0.072 Cm | Density method |
| Thick of fabric as a film | 0.036 Cm | |
| Thickness of TPU film #1 | 0.023 Cm | |
| Thickness of TPU film #2 | 0.014 Cm | |
| Total thickness joint Volume method | 0.073 Cm | Volume method |
| Actual thickness | 0.92 Cm | After bonding |

TABLE #1-continued

Joint process showing temperature and pressure controlled bonding Example #1

| | | |
|---|---|---|
| Void thickness as a film | 0.019 Cm | After bonding |
| Void thickness as a percentage | 21% | After bonding |
| Creep resistance @ 450 lbf/inch 140 F. | <1 Hour | |

TABLE #2

Joint process showing thickness-controlled creep resistance

| | | |
|---|---|---|
| Bonding temperature | 340 F. | |
| Bonding Pressure | 250 PSI | |
| Bonding time | 90 Sec | Clamp until cool down |
| Average thickness of fabric joint | 0.1016 Cm | Before bonding |
| Thickness of joint based on no voids | 0.072 Cm | Density method |
| Thick of fabric as a film | 0.036 Cm | |
| Thickness of TPU film #1 | 0.023 Cm | |
| Thickness of TPU film #2 | 0.014 Cm | |
| Total thickness joint film assumption | 0.073 Cm | Volume method |
| Actual thickness | 0.078 Cm | After bonding |
| Void thickness as a film | 0.0054 Cm | |
| Void thickness as a percentage | 6.95% | after bonding |
| Creep resistance @ 450 lbf/inch 140 F. | 1000 Hours | |

As can be seen from the creep resistance of this system as illustrated in Tables #1 and #2, the change in the bonding thickness and reduction of void fraction or percentage from 20% down to 7% makes a significant difference in creep resistance at high loads, resulting in vastly improved performance life of 1000 hours.

In some instances it may be advantageous to remove heat but not pressure from the joining process; in other words to maintain pressure on the joint during the temperature cooling phase of the heat sealing process. This can be accomplished in a single step process or a two stage heating and cold pressing process, as for example by using consecutive heated and non-heated presses on a section of the joint in process.

Since in accordance with one variation of the invention, the integrity of a fabric joint can be ensured by establishing a maximum overall thickness of the joint, existing fabric joints can be measured to determine if the joints have been properly made and/or if the joints may fail under service conditions. In another aspect of the invention, the integrity of a fabric joint can be evaluated by determining an initial thickness of the fabric layers before being joined together, and determining a maximum joint thickness based on the initial thicknesses of the fabric and/or any tape layers that will be part of the joint. The measured thickness of the joint formed from the fabric layers is compared to the pre-calculated maximum joint thickness, and the joint integrity can be evaluated based on the comparison. As seen in the examples, the joints made with a volume void percentage of less than 15% meet this criteria.

Density Method

In one aspect of the invention, joint formation parameters, such as adhesive film thickness, fabric layer weave openness, temperature, pressure, and dwell time are adjusted to ensure that microvoids in the adhesive between the fabric layers are eliminated. The inventors have found that such voids can nucleate failure of the joint. For example, a relatively large discontinuity of modulus typically exists between fibers in the fabric layers and the adhesive. Voids in the adhesive can give rise to even larger discontinuities of modulus, and thus concentrate stress near the voids. These stress concentrations can cause local failure of the joint that can propagate to other portions of the joint and result in joint failure.

The density method of the invention is one way to measure the void concentration of the joint. In this method the theoretical density of a structural composite, be it a joint or other assemblage of fiber or fabric layers and adhesives, is calculated from the measured values of the components. Density gradient columns or commercial density solutions, such as those available from Fisher Scientific Co., are used to measure the specific gravity (SG) of the component materials. The parts are then bonded using various candidate methods and the SG of the joint is measured. As can be seen from the example #2, if the actual density can be made to approach the calculated density the joint performance is enhanced. The reduction of internal voiding is the likely mechanism of the sought-after improvement in creep resistance. In a preferred embodiment process and product, the density of the joint is 85% of the theoretical max density.

TABLE #3

Comparison of Pre-calculated optimal joint density versus actual joint density

| Joint Density Control Example #2 | Pressure control joining | Density control Joining | |
|---|---|---|---|
| Fabric | Vectran | Vectran | |
| Denier | 200 | 200 | |
| Fiber SG | 1.41 | 1.41 | |
| TPU #1 used in tape | 0.102 | 0.102 | Mm |
| TPU #1 SG | 1.2 | 1.2 | |
| TPU #2 used in base fabric | 0.051 | 0.051 | Mm |
| TPU #2 SG | 1.12 | 1.12 | |
| Drawn film thickness | 0.013 | 0.013 | Mm |
| Film SG | 1.4 | 1.4 | |
| Unbonded Joint Thickness | 0.635 | 0.635 | Mm |
| Hot Press Temp | 400 | 400 | F. |
| Hot Press Pressure | 50 | 50 | PSI |
| Hot Press Dwell Time | 30 | 30 | Sec |
| Cold Press Pressure | 30 | 200 | PSI |
| Cold Press Dwell Secs. | 30 | 30 | Sec |
| Bonded Joint Thickness | 0.58 | 0.36 | Mm |
| SG Actual | 0.986 | 1.239 | |
| SG theoretical | 1.296 | 1.296 | |
| SG actual/SG Theoretical | 76% | 96% | |
| Creep resistance @ 150 lbf 140 f. | 2 | 600 | |

Fiber Wetout Methods

Figure 9A:
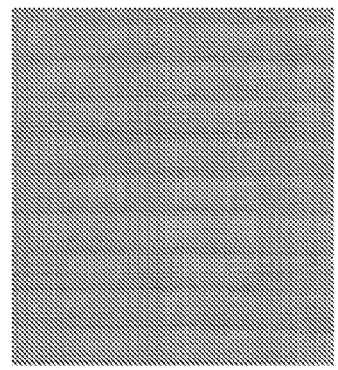
FIG. 9A is an electron photograph of an Example 2A well bonded high density joint showing fiber wetout to TPU resin.
Figure 9B:
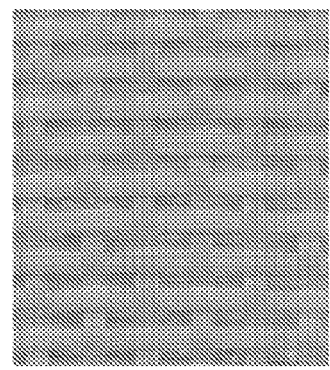
FIG. 9B is an electron photograph of a low creep resistant joint showing light scattering and fiber to resin voids at the interface.

Referring now to FIG. 9, in one preferred embodiment the bonding methods of examples #1 and #2 are used in combination. The thickness methods and the density methods are applied to the joining process and control of the joint formation. An additional step is also employed. The resin system is not pigmented. A pigmented top layer can be used but the TPU materials and the adhesive system is not pigmented. The optical properties of TPU allow for an additional quality control technique. When there are voids present at the interface between the fiber and the TPU, light is scattered and the fiber is distinct and visible in the structure.

If the joint has been made with the thickness control and with the correct density control the fiber is much less visible in the resin matrix. In the case of the well bonded joint the voids are substantially eliminated and the TPU is in intimate contact with the fiber surface. The joined composite optical properties are noticeably changed and there is little scattering of light at the fiber/TPU interface. In some preferred embodiments the 3 methods of quality control parameters are used in combination to produce the best joints for creep resistance.

Referring now to FIG. 1, there is shown a portion of an open weave fabric layer 1 that can be used with the invention. In this example, the fabric layer 1 is shown with warp yarn 11 extending vertically in the figure and fill yarns 12 extending horizontally. Preferably, the warp and fill yarns 11 and 12 are bundles of high tenacity fibers, e.g., fibers having a tenacity of 10 grams/denier or higher. The bundles can have an approximate diameter of 0.1-20 mm. However, as mentioned above, the fabric layer 1 could include fibers of various different types, strength, modulus, size, etc. In addition, individual monofilaments, rather than fiber bundles, could be used to make the fabric layer 1. The fabric layer 1 can incorporate different types of weaves, knit patterns, or other patterns for joining fiber layer 1. Preferably, the fabric layer 1 has a plain or basket weave. The fabric layer 1 also preferably has an open-weave pattern such that there are open spaces 13 between the warp and fill yarns 11 and 12. Preferably, the ratio of yarn area to open area (or cover), is 50%. However, the invention can be used with closed weave patterns in which few or no spaces 13 are formed between yarns 11 and 12. The fabric layer 1 can also be treated, coated and/or joined with various substances. For example, the fabric layer 1 can be a laminated structure that includes a woven fabric joined to a sheet material, such as a sheet plastic or resin layer bonded to the fabric. Thus, the term fabric layer refers to any structure that includes at least one layer of fabric, i.e., a woven, knitted or otherwise joined plurality of fibers. In the description below, the fabric layers include only single layers fabric having woven yarns. This description should not be construed as limiting the invention in any way to joining only single layer fabric sections together.

Figure 2:
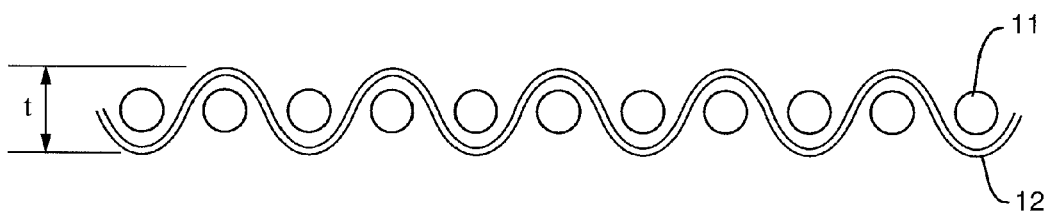
FIG. 2 shows a cross-section of the open-weave fabric of FIG. 1.

Referring to FIG. 2, there is shown a cross section of the fabric layer 1 of FIG. 1. Preferably, the fabric layer 1 has adequate crimp to prevent joint failure particularly a sliding-type failure. In a sliding failure the creep in the resin allows one of the fabrics to un-weave and slide apart leading to a joint failure. One example of a sliding-type failure is when a group of fill yarns 12 slide along warp yarns 11 and create a relatively large gap between the sliding fill yarns 12 and the other non-sliding fill yarns 12. For example, as shown in FIG. 1, a group of 14 of fill yarns 12 could slide downward in the direction of the arrow shown in FIG. 1 away from a group 15 of fill yarns 12 in a sliding-type failure. Adequate crimp of yarns 11 and 12 in the fabric layer 1 can help to prevent such sliding failure. Preferably, crimp in the fabric layer 1 is about approximately greater than 2%. However, such degrees of crimp are not required.

Figure 3:
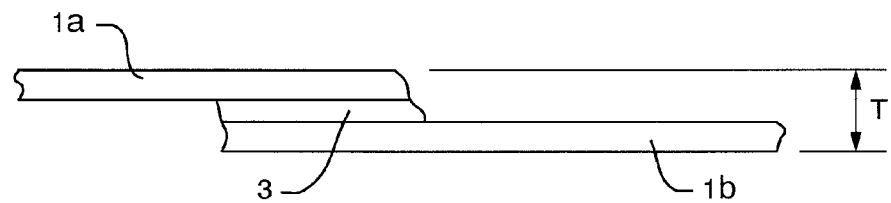
FIG. 3 shows a cross-section of a lap-type joint.

FIG. 3 illustrates a lap-type joint that can be formed according to the invention. In this example, a first fabric layer 1a is a joined to a second fabric layer 1b by a thermoplastic adhesive 3. A thickness T of the joint can be highly controlled. The integrity of the joint can be ensured by joining the fabric layers 1a and 1b so that the joint thickness T is within a desired range and/or less than a threshold thickness. By controlling the joint thickness T, a minimal or maximum allowable separation between the fabric layers 1a and 1b can be ensured. In this illustration, the thickness of the adhesive layer 3 is highly exaggerated for clarity. In general, a joint formed according to the invention will have a minimum adhesive layer 3 thickness so that the opposing facing fiber surfaces of the fabric layers 1a and 1b are in close proximity with each other. The resin volume is selected to allow for close proximity but deliver a nearly voidless joint when the target thickness is reached.

The target thickness is defined as in example #1 by calculation of the film thickness of all the composite layers. The final actual thickness of the joint should approach this minimum theoretical thickness. Adhesive thickness beyond that required to construct a void free joint should be avoided to the extent practical. In the preferred embodiment the joint is approximately 50% adhesive by thickness or less and the actual thickness is no more than 15% greater in thickness than the minimum thickness of the overall joint.

Figure 4:
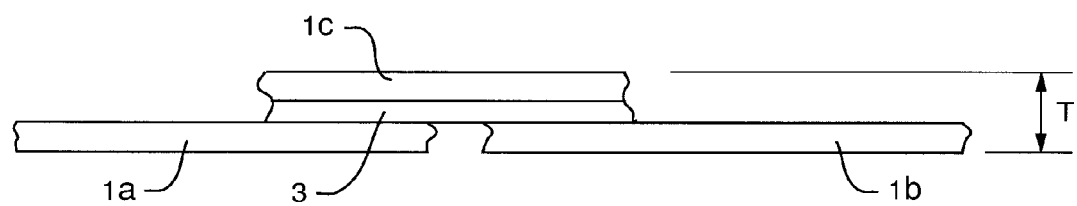
FIG. 4 shows a cross-section of a tape-type joint.

FIG. 4 illustrates a tape-type joint. In this example, a first fabric layer 1a is joined to a tape 1c which, in turn, is joined to a second fabric layer 1b. The tape 1c can be a fabric layer that is identical to either or both of the fabric layers 1a and 1b, or the tape 1c can be a fabric that is different than both fabric layers 1a and 1b. For example, the tape 1c can be designed to provide high strength at the joint, while providing good flexibility. For example, the tape 1c can have a different degree of crimp than both of the fabric layers 1a and 1b. As with the joint shown in FIG. 3, opposing facing surfaces of the fabric layers 1a and 1b and the tape 1c are in contact, or are nearly in contact with each other after the joint is formed. As one example, the fabric layers 1a and 1b can be open weave fabrics having an aerial cover of about approximately 50% or greater and a crimp of about approximately 2% or greater. The tape 1c is an open weave fabric having a cover of at least 50% and crimp of at least 2%. In this case, the maximum post processing joint thickness is between approximately 10-17% greater than the minimum theoretical thickness of the joint.

Forcing the opposing faces of the fabric layer 1a and 1b (and the tape 1c) together increases the strength of the joint. For example, bringing the opposing faces of the fabric layers 1a and 1b (and the tape 1c) into close proximity forces the adhesive 3 into opposing faces and, therefore, eliminates voids in the adhesive layer 3 and the fabrics layers (1a, 1b 1c). Forcing the adhesive 3 into the opposing faces also decreases the amount of adhesive thickness 3 through which shear forces on the joint are transferred. Thus, a relatively smaller amount of low modulus adhesive is relied on for the overall joint strength. The creep behavior of the joint is dramatically improved where the voids are uniformly minimal throughout the length of the joint.

Figure 5:
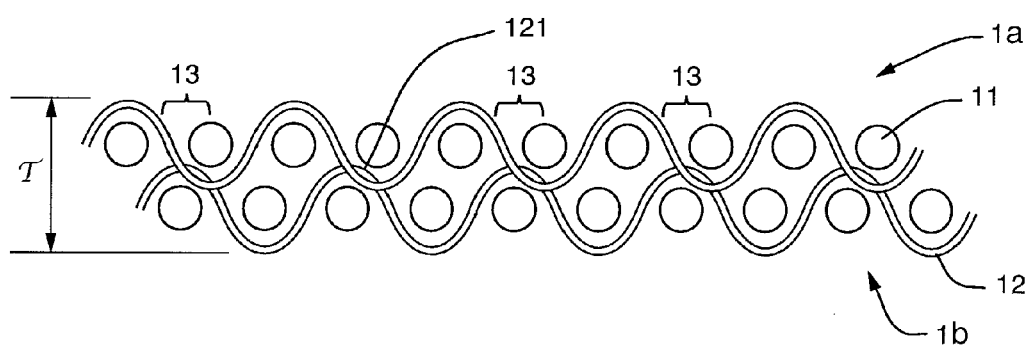
FIG. 5 shows a cross section of a joint between layers of the open weave fabric of FIG. 1 and 2.

Forcing the fabric layers 1a and 1b (and the tape 1c) into close proximity may also cause the fabric layers 1a and 1b (and the tape 1c) to interlock as shown in FIG. 5. In this example, peaks 121 of the fill yarn 12 in the fabric layer 1b are urged into spaces 13 in the fabric layer 1a. Thus, the peaks 121 can act like teeth that engage with the spaces 13 in the opposing fabric layer 1a. Accordingly, shear forces on the joint are more likely to be translated to fibers within the fabric layers 1a and 1b, rather than only, or mainly, on the adhesive 3. For example, if a shear force is exerted on the fabric layer 1b such that the fabric layer 1b is pulled toward the right as shown in FIG. 5, peaks 121 of the fill yarn 12 that are in contact with, or are nearly in contact with warp yarns 11 in the fabric layer 1a transfer in the shear force on the fabric layer 1b to the warp yarns 11 in the fabric layer 1a. Thus, the relatively higher strength yarns in the fabric layers 1a and 1b can bear most of the shear force on the joint as opposed to the adhesive 3 bearing all or most of the shear force. It should be noted, however, that interlocking of the fabric layers 1a and 1b in FIG. 5 is not required.

Since the overall thickness of a joint can indicate the integrity of a joint, existing fabric joints can be measured to determine if the joints have been properly made and/or if the joints have failed (in an unobservable way) or may fail in the future. For example, the integrity of a fabric joint can be evaluated by determining an initial thickness of the fabric layers before being joined together, and determining a maximum joint thickness based on the initial thicknesses of the fabric layers. The measured thickness of the joint formed from the fabric layers is compared to the pre-determined maximum joint thickness, and the joint integrity can be evaluated based on the comparison.

In general, the maximum joint thickness is not determined only by adding the nominal thicknesses of the fabric layers that are joined together. The maximum joint thickness is less than the sum of the initial fabric layer thicknesses. The maximum thickness may be determined mathematically, the films and adhesive layers offer no difficulty in calculation of thickness as in general they are directly measurable. However the fabric void-less thickness must be calculated from a supplied or measured SG (specific gravity) value from the fiber. The SG and the unit mass per area then allow the fabric "film thickness" to be calculated. As has been shown from example #1, the actual thickness of the joints can not generally be reduced to the minimum theoretical thickness. As is shown in the examples high and low creep resistance are not separated by a large factor in either thickness or density. For this reason the bonding thickness thresholds are preferably researched by testing the strength, creep resistance and durability and other joint integrity characteristics of a variety of joints of different thicknesses and densities. The thickness and density thresholds can then be set for joints of known materials and characteristics.

The methodology of the invention, in the broad sense, includes the preliminary steps of measuring selected parameters of two fabric layers to be joined, as well as the adhesive and any tape or other materials intended to be included in the joint, and then calculating an optimal value of a quality control parameter or indicator of an ideal joint that can be measured after the joint is finished. Indicators such as joint thickness, specific gravity or opacity are useful. The joint is assembled using the two fabric layers and other materials in the desired order. Sufficient heat for the type of adhesive is applied to the joint along with sufficient pressure until the selected quality control parameter or indicator is satisfied.

Figure 6:
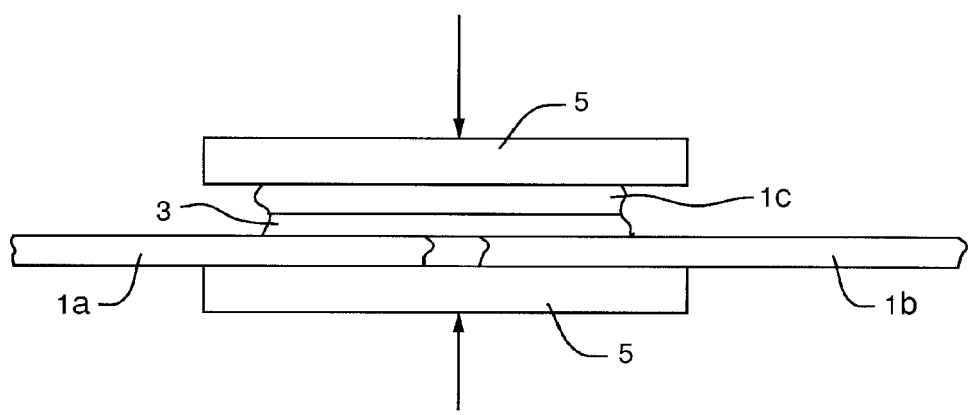
FIG. 6 shows pressure being applied to a tape-type joint.

An exemplary method for forming a joint is next described in connection with FIGS. 6 and 7. Although FIG. 6 shows the formation of a tape-type joint, the described method can by analogy be used to form a lap-type joint, or to form laminated fabric layer structures or other structures.

In a preliminary step, the fabric layers and other materials for the joint are identified and measured for initial values of parameters relating to the thickness of an ideal finished joint with minimal voids. There is calculated or otherwise derived a theoretical thickness of an ideal joint fabricated from the identified materials, and the necessary compaction or displacement from initial thickness required to achieve it.

In step S5, the identified fabric layers and other joint materials are assembled. For example, two fabric layers $1a$ and $1b$ was well as tape $1c$ can be provided. The fabric layers $1a$ and $1b$ can be hull sections of an airship or other fabric structure and can be made of woven yarns that include high strength fibers having a tenacity of 10 g/denier or higher. The fabric layers $1a$ and $1b$ and the tape $1c$ preferably have an open-weave structure, although closed-weave fabrics can be used. The fabric layers $1a$ and $1b$ and the tape $1c$ can be identical in both material composition and structure, or the fabric layers $1a$ and $1b$ and the tape $1c$ can be different from each other. Thus, the tape $1c$ can be constructed to provide good longitudinal flexibility of the joint with high lateral strength. The tape $1c$ can also have a different degree of crimp compared to fabric layers $1a$ and $1b$. Such varying degrees of crimp can reduce the likelihood of sliding-type failure at the joint while also providing low weight and desired flexibility and strength of portions of the fabric layers $1a$ and $1b$ away from the joint.

In step S10, at least the facing surfaces of the fabric layers are saturated with the identified adhesive. The adhesive can by any type of adhesive but preferably is a thermoplastic material, such as TPU. The adhesive can be solvated and might contain chemically reactive species such as isocyanates, silanes or blocked isocyanates. Saturating can be performed using a reverse roll process, dip coating process or knife over roll process or other known or future developed processes for applying the adhesive and/or carrier to the fabric layers. The saturating mixture can also include adhesion promoting agents or other bonding materials, such as isocyanates, silanes or blocked isocyanates. The saturating mixture is preferably applied at a solution viscosity or melt viscosity necessary to provide partial saturation or penetration of the fiber bundles. In addition, two or more saturating passes can be used if desired. The saturating process is intended to provide good chemical adhesion between the adhesive and the fiber in the fabric layer. Preferably, the adhesive encapsulates, but does not completely penetrate the fiber bundles, or yarns, in the fabric layers. However, depending upon the adhesive and its mechanical properties, the adhesive could penetrate the fiber bundles, if desired.

In step S15, a relatively thick adhesive film is applied between the fabric layers. The adhesive film preferably is voidless, e.g., has no gas bubbles within the film, and has sufficient thickness so that when the fabric layers are later forced toward each other, the adhesive is squeezed into the fabric interface so that voids are eliminated and/or not created between the fabric layers. The adhesive film could be created by depositing multiple layers of adhesive on one or more of the fabric layers, but this process may be undesirable in that voids may be formed in the adhesive film. As one example, a cast or extruded film of adhesive, such as TPU, that is 0.5 to 5 mils thick is positioned between the fabric layers. The adhesive film can also include bonding enhancing materials, such as blocked isocyanates, that are activated after exposure to relatively high temperatures over a prolonged period of time. The adhesive film can be applied to one of the fabric layers before the fabric layers are assembled. For example, the adhesive film can be applied to a joint tape $1c$ that is used to join tow fabric layers $1a$ and $1b$ together. Alternately, an adhesive film can be applied to all of the fabric layers to be joined together. Preferably, only a single adhesive film is used to join the fabric layers so that voids in the adhesive can be eliminated during subsequent processes.

In step S20, heat and pressure are applied to force the layers together until at measuring step 25, the pre-calculated necessary thickness or displacement indicating sufficient proximity of the facing surfaces of the fabric layers is achieved. For example, a pair of heated platens, opposed rollers or other pressing surfaces 5 can be used to force the fabric layers together while heating the layers $1a$-$1c$ and/or the adhesive 3. Preferably, the adhesive film is heated to near its melt point, e.g., about 350° F. for a urethane film having a melt point of 360-370° F. Pressure of approximately 100 psi or greater is applied to the fabric layers to force the adhesive in the adhesive film to be squeezed into the facing surfaces of the fabric layers. At least pressure and heat may as well be maintained on the joint until the facing surfaces of the fabric layers are within sufficient proximity as indicated by the thickness of the joint compared to the calculated or theoretical thickness of an ideal or optimal joint. Preferably, the heat and pressure are maintained for a period of 10-60 seconds, more preferably 30-60 seconds, but pressure at least is maintained until the joint has a desired thickness T.

Summarizing, appropriate spacing of the facing surfaces of the fabric layers, and by extension, the thickness of the joint T, can be achieved by applying pressure until the press platens, roller surfaces or other pressure-applying devices 5 are brought within a desired spacing. This minimizes the adhesive thickness between the fabric layers, minimizes voids, and may allow the fabric layers to interlock to some extent, thereby strengthening the joint.

According to this method, the quality control factor or indicator for proper fabric joint formation is thickness or displacement of the joint in fabrication, rather than a specific amount of heat, pressure or time. That is, the fabric layers can be forced together using heat and pressure for whatever independent time period necessary to ensure that the facing surfaces of the fabric layers are close to the theoretical ideal thickness of the joint, since proximity of the facing surfaces can be calculated based on the overall thickness T of the joint formed.

Steps S10, S15 and S20 can be performed at any desirable timing during the overall process. For example, the fabric layers could be saturated long in advance of the time when the adhesive film is applied between the fabric layers. Likewise, the adhesive film could be applied to one or more of the fabric layers long in advance of the fabric being joined together. Similarly, the adhesive film can be heated before being applied to one of the layers and before pressure is applied to the joint.

Figure 7:
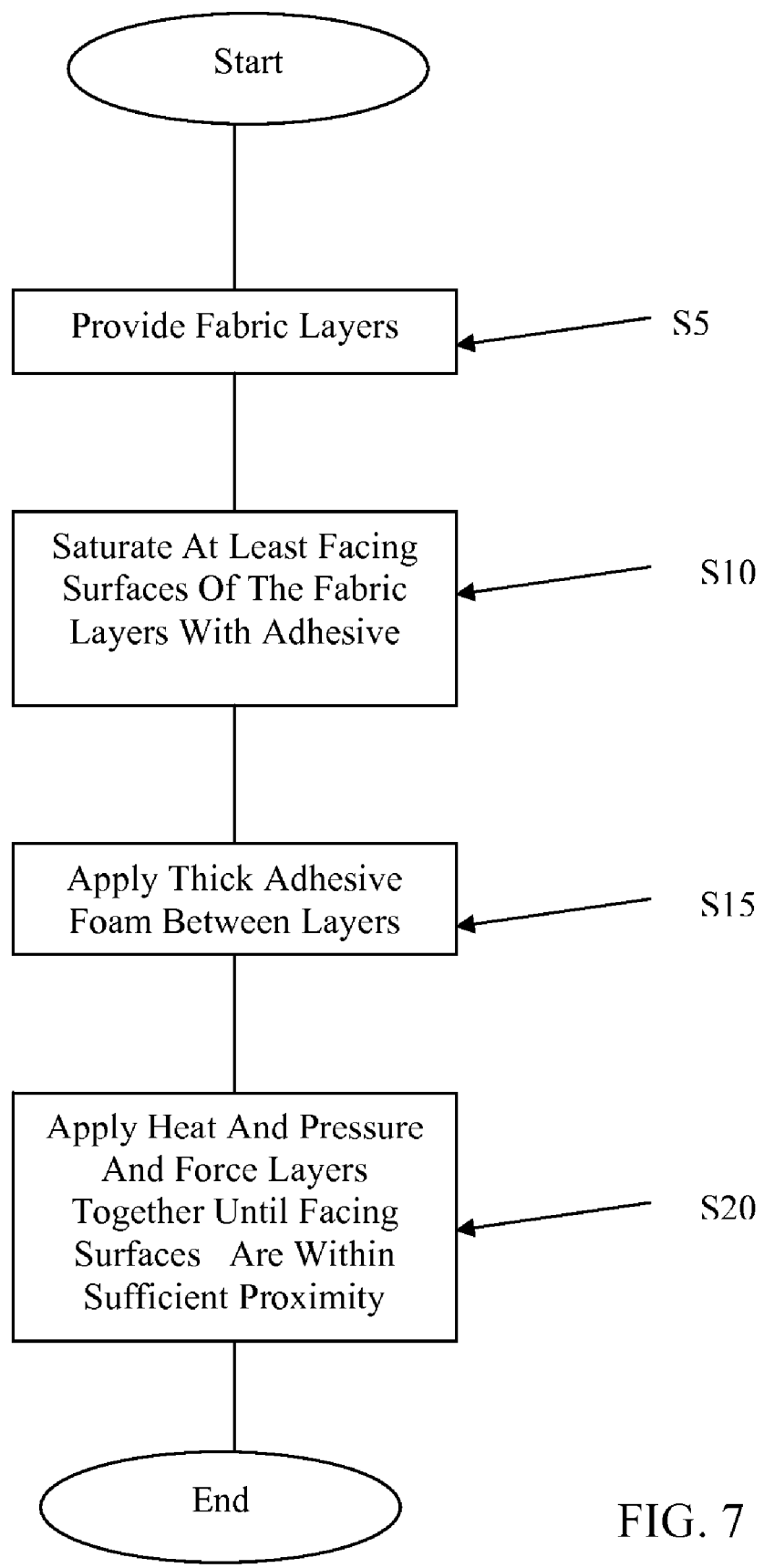
FIG. 7 is a flowchart of steps of a method for joining fabric layers for to control thickness close to the theoretical thickness
Figure 8:
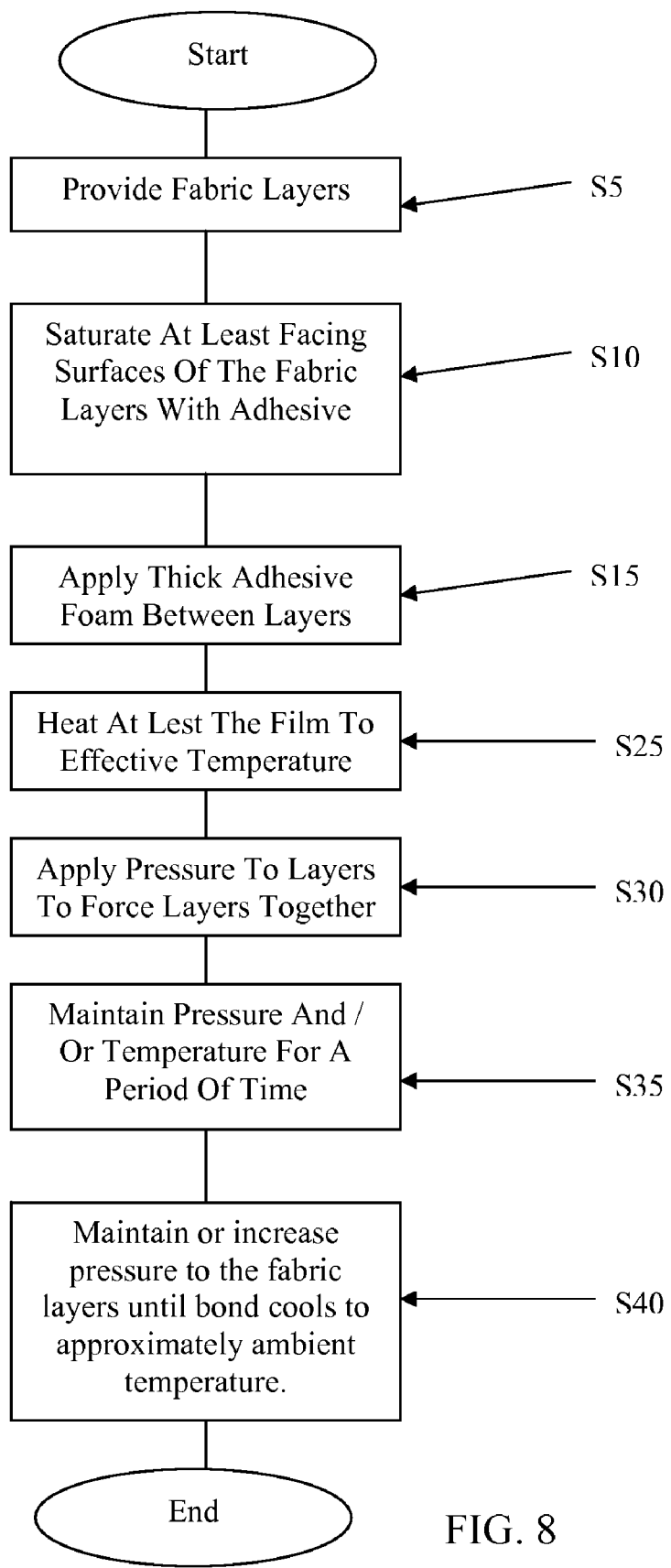
FIG. 8 is a flowchart of steps of a density-controlled method for joining fabric layers.

Referring now to FIG. 8, there is illustrated a flow chart of steps of an alternate method for joining fabric layers. The preliminary steps of FIG. 7 are assumed, extending to calculations of ideal values of such further control variables as joint specific gravity, joint density, joint thickness, and joint opacity. This in all cases must result in a predetermined target value for the particular quality control variable or indicator being used in the instant case, such as the theoretical or predetermined target density of an ideal joint as derived from the density of the original joint materials, when joint density is being sampled for quality control.

The target value of the selected variables for the finished joint may be derived from the job at hand or selected from a previously prepared data library of such information.

Steps S5, S10 and S15 are substantially the same as those in the flow chart shown in FIG. 7, and thus are not described in detail.

In step S25, the adhesive film is heated to a desired temperature. Preferably, the adhesive film is heated to near its melting point. For example, for a urethane film having a thickness of 0.5-5 mils, the film is heated to about 350° F. The film can be heated prior to being applied to one or more of the fabric layers, or after the film is applied to one of the layers. Heating can be performed in any desired way, including convective, conductive, radiant and/or radio frequency heating.

In step S30, pressure is applied to the fabric layers to force the fabric layers together. Preferably, a pressure of approximately 100 psi or greater is applied to the fabric layers to force the facing surfaces of the fabrics layers towards each other. The applied pressure also forces adhesive into the fabric layer interface. Pressure can be applied by one or more pairs of rollers, press platens, or other devices. The rollers, platens or other devices used to applied pressure to the fabric layers can also be used to heat the fabric layers and/or the adhesive at the joint. Steps 25 and 30 may be practiced in either order.

In step S35, pressure and/or temperature are applied to the joint and maintained for independently desired times. For example, the pressure and temperature could each be maintained for extended respective periods of 10-60 seconds or more preferably 30-60 seconds. The pressure and temperature periods may be concurrent or overlapping to any or no extent. Note that shorter periods of repetitive applications of heat and/or pressure, with periods of relaxation or even cooling being applied in between, are within the scope of the invention. The extended time periods for heat and pressure described above can also activate bonding agents in the adhesive that are only activated after exposure to elevated temperature and/or pressure for an extended time.

According to one embodiment, an additional step S40 may be added. This step is a cold pressing cycle that may be used after the heating cycle in effect being part of the joint curing process, to further control or minimize thickness and improve the interlock between layers. A pressure preferably equal to or greater than the pressure of the heated step is applied to the fabric by platens or rollers as necessary maintain the selected quality control parameter. This pressure is typically maintained until the bond is cooled to approximately ambient or room temperature; meaning a nominal range of about 60 to 110, or more likely 70 to 90 degrees Fahrenheit, as might be expected in a typical production facility.

The density of the joint is then checked in step S45. As discussed above, density is an easily measured characteristic or parameter of the finished joint. It is useful in determining the quality of the joint, e.g. the extent to which voids have been eliminated, if the necessary data on the joint materials was measured or known in advance so that an ideal or target value could be calculated. Because most density measurement is done by floating a sample in a density controlled liquid this method of evaluating joint condition is destructive. However quite small samples, approximately 5 mm×5 mm, are required for density measurement, so test coupons are generally used, and the testing is quick and easily accomplished.

The density of the joints that are to be produced are checked with sections of test material and the process is validated. As fabric weight and other joint materials vary, the bonding process will need to be recalibrated. The advantage of the density method is insensitivity to thickness variations in the fabric and adhesive materials. The theoretical density of the fabrics system can be recalculated for each lot and the target density can be set for that lot of joints.

In step S45, the theoretical or target density is set from the component SG (specific gravity) values in a mass weighted average of the composted SG. The target density of the joints should be within 85% of the theoretical maximum density of the joint materials, or such other percentage as testing and experience dictates to be acceptable for the application at hand.

When the target density is measured and set, the thickness of the joints can be correlated and established and used as a non-destructive process control parameter as indicated in step S50. As long as the materials entering the joining process are controlled in mass, the non-destructive, ongoing, joint thickness control will predict a good joining process. Also note, because of the nature of thermoplastic materials, if a section of joint is not on the target density and thickness, the joint may be reworked or rebounded as in step S55, and of course rechecked again as in step S50.

While a flow chart of an optical density based process for controlling joint fabrication is not explicitly shown or explained in detail, the description and figures provided would enable one skilled in the art to readily practice combinations and variations of the invention that incorporate consideration of the optical density characteristics of the joint.

With respect to quality control in production, the processes of the invention may be conducted such that a section or portion of joint just finished is checked for thickness or opacity or other useful, non-destructive quality control parameter while the next section is still in process, the process step underway being then modulated or modified as in any or all of pressure, heat, time and thickness, as required, to correct small deviations in the desired quality control parameter. This quality measurement/feedback control loop may be manual or automated and be cycled as frequently as operational conditions and equipment performance dictates, and may be calibrated to a destructive test done on a sampling basis, as for specific gravity and density of the finished joint as described above.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

For example, there is within the scope of the invention, a method for joining fabrics consisting of the steps of measuring initial values of selected characteristics of the fabrics and all other materials intended to be included in the resulting joint, and calculating therefrom an optimal value for at least one control parameter for a joint of desired quality that can be non-destructively applied to the joint. Then organizing the fabrics and all other materials into an assemblage of the desired order for the joint, and applying heat and pressure to the assemblage while applying control parameter until the optimal value of the control parameter is achieved. The selected characteristics of the fabrics and other materials may be at least one of thickness, volume, specific gravity, density, and opacity. The control parameter may be joint thickness or density or opacity or any combination. Applying the joint thickness control parameter may include applying pressure with a pressing mechanism of any sort that has a closed press limit about equal to the optimal value of joint thickness. Alternatively, applying joint thickness as the control parameter may mean a feedback scheme of relieving the heat and pressure from a section of the joint, measuring the actual value of joint thickness of the section, and then comparing the actual value to the optimal value and providing a feedback signal for adjusting the closed press limit to correct the actual value towards the optimal value.

There may be selected an additional control parameter and an optimal value calculated for a joint of desired quality, where application of the parameter may require destructive testing of samples of the joint, and the method for joining fabrics has the further step of correlating the optimal value of the control parameter that can be non-destructively applied with the optimal value of the additional control parameter that is or may be destructively applied.

As another example of the invention, there is a method for joining at least two fabric layers, with the steps: providing at least two fabric layers; saturating at least facing surfaces of the fabric layers with an adhesive; providing an adhesive film between the fabric layers; and applying heat and pressure to the fabric layers until a thickness of the joined fabric layers is reduced to not more than a predetermined optimal thickness for a joint of desired quality. The step of providing fabric layers may mean providing at least one fabric layer that includes fibers having a tenacity of 10 g/denier or higher, or at least one fabric layer consisting of woven yarns including fibers having a tenacity of 10 g/denier or higher, or even providing two fabric layers including woven yarns that each include fibers having a tenacity of 10 g/denier or higher.

Further, providing at least two fabric layers may mean providing a first fabric layer having woven yarn and first a degree of crimp; and providing a second fabric layer having woven yarns and a second degree of crimp. There may be a first fabric layer that has a first degree of crimp in a section to be joined to a second fabric layer and has a second degree of crimp in a portion not joined to the second fabric layer. There may be two fabric layers and a tape fabric layer, where the two fabric layers include airship hull sections and the tape is used to join the hull sections together. The saturating at least facing surfaces may mean applying an adhesive to the fabric layers so that the adhesive encapsulates fiber bundles, but does not fully penetrate fiber bundles in the fabric layers. The saturating may mean applying an isocyanate-based urethane to the fabric layers. And the providing of an adhesive film may include providing an extruded or cast resin film between the fabric layers, and it may have a thickness of 1.0 mm or more. Alternatively, it may mean providing an adhesive film having a thickness of at least 2 mm to a tape-type fabric layer.

Also, the providing of an adhesive film can mean providing bonding agents in the adhesive film that are activated after exposure to a temperature above 300° F. for a time of greater than 30 seconds. Applying heat and pressure may mean heating an adhesive film to a temperature near the melt point of the adhesive. The invention may include applying a cold press cycle to the fabric layers wherein at least 100 psi of pressure is applied to the fabric layers until the layers cool to about ambient temperature. Applying heat and pressure may mean heating a urethane film to a temperature near 350° F., and/or applying pressure to the fabric layers so that adhesive in the adhesive film is squeezed into open spaces in the fabric layers.

As yet another example of the invention, there is a method for joining at least two fabric layers, that includes the steps: providing at least two fabric layers; saturating at least facing surfaces of the fabric layers with an adhesive; providing an adhesive film between the fabric layers; applying heat and pressure to the fabric layers so as to form a joint; monitoring the quality of the joint for voids in the adhesive; and adjusting at least one joint formation parameter whereby the voids in the adhesive between the joined fabric layers are eliminated and avoided. The joint formation parameters may consist of adhesive film thickness, fabric layer weave openness, adhesive heating temperature, pressure applied to the joint during formation, a time that the adhesive is maintained near its melting point, and a time that pressure is applied to the fabric layers.

Monitoring the quality of the joint for voids may mean obtaining optical images of the joint indicative of opacity and clarity of weave pattern resulting from fiber and adhesive interface within the joint; comparing the opacity and clarity of weave pattern in the optical images with that of a control image of a joint sample of desired quality, and calculating the quality of the joint therefrom.

As still another example of the invention, there is a method for determining the integrity of a fabric joint, consisting of the steps: determining an initial thickness of the fabric layers before being joined together; determining a maximum joint thickness based on the initial thicknesses of the fabric layers; measuring an actual thickness of a fabric joint formed from the fabric layers; and comparing the actual thickness of the joint with the determined maximum joint thickness.

As yet another example, there is a method for joining at least two fabric layers, with the steps: providing at least two fabric layers; saturating at least facing surfaces of the fabric layers with an adhesive; providing an adhesive film between the fabric layers; and applying heat and pressure to the fabric layers until a sample of the joined fabric layers is reduced to not more than a predetermined optimal density for a joint of desired quality. The adhesive film has bonding agents that are activated after exposure to a temperature above 300° F. for a time of greater than 30 seconds.

An additional example of the invention is a fabric joint connecting abutting sections of fabric, consisting of a composite fabric and adhesive laminate structure made from at least two fabric layers of which at least the facing surfaces of the fabric layers had been saturated with a thermoplastic adhesive, a thermoplastic adhesive film disposed there between, and heat and pressure applied thereto. The pre-joining thickness of each of the fabric layers and the thermoplastic adhesive film are known, and an optimal value of joint thickness for a joint of desired quality was calculated therefrom. The composite fabric laminate structure consists of the fabric layers being bonded together in close proximity by the thermoplastic adhesive and thermoplastic adhesive film wherein at least some fiber bundles of the fabric layers are encapsulated, and the composite fabric laminate structure has a thickness of not more than 15% greater than the optimal value of joint thickness. At least one of the fabric layers may have fibers with a tenacity of 10 g/denier or higher. The thermoplastic adhesive may be an isocyanate-based urethane adhesive. The fabric layers may consist of two fabric layers with each layer extending from a respective side of the joint, and one fabric tape layer confined within the joint.

A similar fabric joint is a similar composite fabric and adhesive laminate structure where the pre-joining density of each fabric layer, and the thermoplastic adhesive and the thermoplastic adhesive film are known. An optimal value for joint density for a joint of desired quality was calculated therefrom. The fabric layers are bonded together in close proximity by the thermoplastic adhesive and thermoplastic adhesive film wherein at least some fiber bundles of the fabric layers are encapsulated, and the composite fabric laminate structure has a density of at least 85% of the optimal value for joint density.

Other and various examples within the scope of the claims that follow will be apparent from the description and figures provided.

I claim:

1. A method for joining at least two fabric layers, the method comprising:
    providing at least two fabric layers with known initial thicknesses, specific gravities and unit masses per unit area;
    saturating at least facing surfaces of the fabric layers with known thicknesses of a selected adhesive;
    providing an adhesive film of a known thickness between the fabric layers;
    calculating from respective said initial thicknesses, specific gravities, and unit masses per unit area of said fabric layers, and said known thicknesses of a selected adhesive, and said known thickness of said adhesive film, a theoretical joint thickness for a voidless joint;
    applying heat and pressure to the fabric layers until a thickness of the joined fabric layers is reduced to less than the sum of the initial thicknesses of the fabric layers and within 15% of said theoretical joint thickness.

2. The method of claim 1, wherein providing fabric layers comprises:
    providing at least one fabric layer that includes fibers having a tenacity of 10 g/denier or higher.

3. The method of claim 1, wherein providing at least two fabric layers comprises:
    providing at least one fabric layer comprising woven yarns including fibers having a tenacity of 10 g/denier or higher.

4. The method of claim 1, wherein providing at least two fabric layers comprises:
    providing two fabric layers including woven yarns that each include fibers having a tenacity of 10 g/denier or higher.

5. The method of claim 1, wherein providing at least two fabric layers comprises:
    providing a first fabric layer having woven yarn and first a degree of crimp; and
    providing a second fabric layer having woven yarn and a second degree of crimp.

6. The method of claim 1, wherein providing at least two fabric layers comprises:
    providing a first fabric layer that has a first degree of crimp in a section to be joined to a second fabric layer and has a second degree of crimp in a portion not to be joined to the second fabric layer.

7. The method of claim 1, wherein providing at least two fabric layers comprises:
    providing two fabric layers and a tape fabric layer.

8. The method of claim 7, wherein the two fabric layers include airship hull sections and the tape is used to join the hull sections together.

9. The method of claim 1, wherein saturating at least facing surfaces comprises:
    applying an adhesive to the fabric layers so that the adhesive encapsulates fiber bundles, but does not fully penetrate fiber bundles in the fabric layers.

10. The method of claim 1, wherein saturating at least facing surfaces comprises:
    applying an isocyanate-based urethane to the fabric layers.

11. The method of claim 1, wherein providing an adhesive film comprises:
    providing an extruded or cast resin film between the fabric layers.

12. The method of claim 1, wherein providing an adhesive film comprises:
    providing a cast or extruded urethane film having a thickness of at least 1.0 mm.

13. The method of claim 1, wherein providing an adhesive film comprises:
    providing an adhesive film having a thickness of at least 2 mm to a tape-type fabric layer.

14. The method of claim 1, wherein providing an adhesive film comprises:
    providing bonding agents in the adhesive film that are activated after exposure to a temperature above 300° F. for a time of greater than 30 seconds.

15. The method of claim 1, wherein applying heat and pressure comprises:
    heating an adhesive film to a temperature near the melt point of the adhesive.

16. The method of claim 1 further comprising applying a cold press cycle to said fabric layers wherein at least 100 psi of pressure is applied to said fabric layers until said layers cool to about ambient temperature.

17. The method of claim 1, wherein applying heat and pressure comprises:
    heating a urethane film to a temperature near 350° F.

18. The method of claim 1, wherein applying heat and pressure comprises:
    applying pressure to the fabric layers so that adhesive in the adhesive film is squeezed into open spaces in the fabric layers.

19. The method of claim 1, wherein applying heat and pressure comprises:

applying a pressure of at least about approximately 100 psi to the fabric layers.

20. The method of claim 1, wherein applying heat and pressure comprises:

applying heat and pressure to the fabric layers for a time between 30 and 60 seconds.

* * * * *